June 3, 1924.
G. G. BROWNE
1,496,083
MANUFACTURE OF WORMS FOR WORM GEARINGS
Filed Sept. 23, 1922
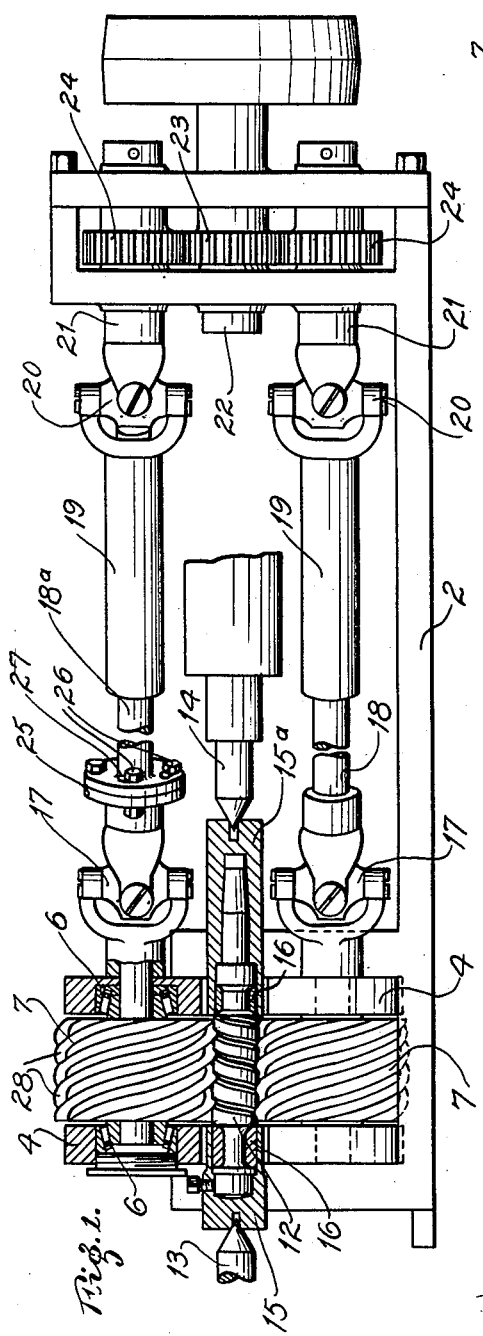
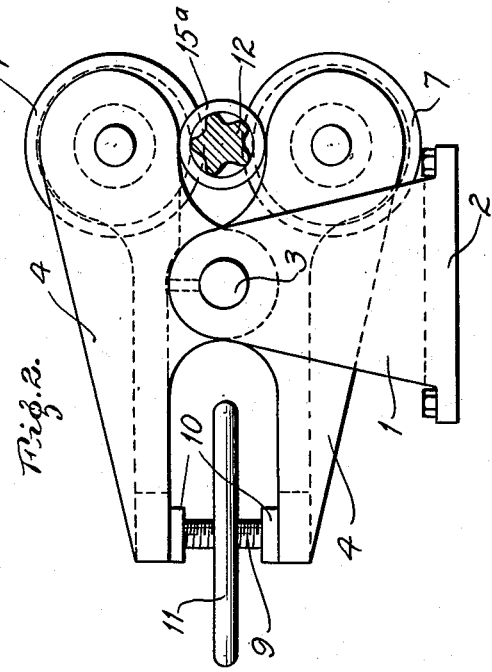
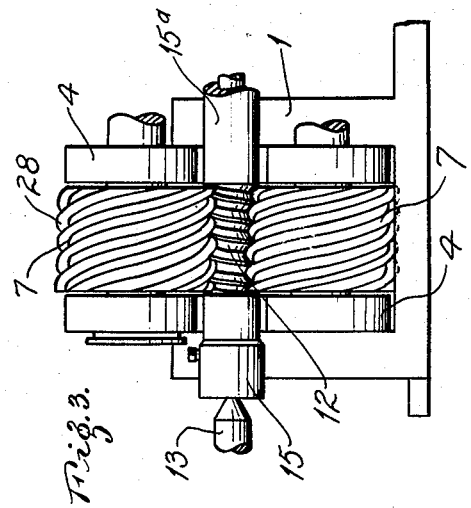
Inventor
Gouverneur G. Browne,
by his Attorneys.

Patented June 3, 1924.

1,496,083

UNITED STATES PATENT OFFICE.

GOUVERNEUR G. BROWNE, OF WINCHESTER, NEW HAMPSHIRE.

MANUFACTURE OF WORMS FOR WORM GEARINGS.

Application filed September 23, 1922. Serial No. 590,046.

*To all whom it may concern:*

Be it known that I, GOUVERNEUR G. BROWNE, a citizen of the United States, and a resident of Winchester, in the county of Cheshire and State of New Hampshire, have invented a new and useful Improvement in the Manufacture of Worms for Worm Gearings, of which the following is a specification.

My invention relates to processes of rolling worms for worm gearing and has for its principal objects to devise a process that will quickly and economically make such worms and that will make worms with accurately formed teeth and with the grain of the metal disposed to the best advantage.

The invention consists principally in rolling a cylindrical bar between a pair of formers, having helical ribs or threads shaped to correspond to the threads of the worm to be formed. The formers and the machine of which they form a part may be of any suitable construction. A preferred construction adapted for carrying out the invention is shown and described in my copending application Ser. No. 479,471, filed June 22, 1921. Said construction is also illustrated in the accompanying drawings in which, Fig. 1 is an elevation of a worm rolling machine embodying my invention, certain parts being shown in section;

Fig. 2 is an end elevation thereof; and

Fig. 3 is a fragmentary side elevation showing a worm in substantially finished form.

The machine illustrated in the drawing comprises a pair of spaced pedestals or uprights 1 mounted on a suitable base 2 and supporting a horizontal member 3 that constitutes a common fulcrum or pivot support for heavy levers 4, disposed one above the other. Each lever has one end bifurcated and the two forks are provided with horizontally alined journal bearings 6, preferably roller bearings adapted to prevent endwise movement, and in said alined bearings 6 are mounted the journals of a rotary former or matrix 7. The formers 7 are mounted on the adjacent ends of the levers and their axes are equidistant from the common fulcrum, or axis of oscillation of the levers. The opposite ends 8 of said levers are connected by a screw 9 that is oppositely threaded at its respective ends which engage threaded members 10 provided therefor on said levers and so mounted as to be capable of accommodating themselves to angular variations in the positions of the levers 4. This screw 9 is provided with means for turning it, as for instance, a hand wheel 11, and thereby actuating the levers 4 to make said formers 7 approach or withdraw from each other.

As stated above, the axes of the two formers are horizontal and equidistant from the axis of their common fulcrum; and the work 12 is mounted horizontally midway between said formers. For this purpose, a head stock 13 and a tail stock 14 are mounted on the pedestals or other portions of the frame of the machine in alinement and relatively movable and otherwise adapted to support the chucks 15 and 15ª in which the work is held and hold the work against thrust endwise, as in an ordinary lathe.

The ends of the work are reduced and may have the shape they will be required to have when the worm is ready for use. Preferably hollow chucks 15 are provided for the work, the bores of which make a close fit with the respective ends of the work. Split rings 16 are provided to fill any gap between the ends of the work and the bore of the chuck. As the ends of the work are firmly held in the chucks displacement of the work under the pressure of the formers is prevented.

By this arrangement, the turning of the screw 9 (which in practice, will preferably be done by automatic mechanism in place of the hand wheel represented) has the effect of swinging the formers 7 toward and from each other in the same circular arc on opposite sides of the work without disturbing their parallel relation; so that each former constitutes both a means for impressing the work and a means for supporting the work against the thrust of the opposite former and thus it preserves the proper alinement of the work.

One end of each former 7 is provided with a universal joint 17 one of which is connected to a link 18 and the other to a link 18ª. Links 18 and 18ª are telescopically mounted in a hollow shaft 19 and are keyed therein so as to rotate therewith and to be free to move longitudinally thereof. Each of said hollow shafts 19 in turn, is connected by a universal joint 20 to a counter-shaft mounted on the frame of the machine. There are two counter-shafts 21, one for each former 7, and they are disposed on opposite sides of the main driving shaft 22 which is provided with a gear 23 that meshes with gears 24 on the respective counter-shafts 21, the last mentioned gears 24 being of the same size in order to give the two formers 7 the same velocity of rotation.

In order to properly index the formers 7, that is, give them the proper circumferential adjustment with relation to each other, link 18ª is divided into two parts and a coupling 25 is interposed between the abutting ends thereof. This coupling 25 comprises abutting flanges that are perforated in alinement to receive locking bolts 26, and one series of perforations is made in the form of circular arcs 27 to permit limited rotary movement of the former 7 independently of the driving mechanism and thus permit adjustment of one former relative to the other.

The process is best adapted for working on plastic metals, and will ordinarily be a hot-rolling operation on metal that has been heated to a fairly plastic condition. The cylindrical stock is mounted in chucks and the formers are properly indexed and moved into engagement with the work. The formers are then rotated. The formers rotate the stock and the ribs of the formers produce channels in the stock. The formers are moved towards each other as the channels in the work are deepened. The feeding may be done manually or mechanically, intermittently or continuously. The operation is continued until the metal of the work completely fills the spaces between the ribs of the formers, thus completing the shaping of the thread of the worm. The formers are then moved away from each other and the finished worm removed from the machine.

The two formers 7 are counterparts. When designed for rolling a worm, each former is made with a series of counter-part helical ribs 28 whose pitch circle diameter is some multiple, preferably five, of the pitch circle diameter of the worm desired. By virtue of this mathematical relation and the fact that the work is rotated by the formers, their contacting surfaces will rotate at the same speed but the work will rotate a definite multiple of times for each rotation of the former. When the ratio of rotations of the work relative to the former is five to one, and considering a single revolution of a single rib on the former, it would (if operating alone) impress in the work a continuous helical channel with five complete turns. As the ribs of a former are equidistant and parallel, and equal in number to the above specified ratio of the former to the work, each of said ribs will turn in register with the channel impressed in the work by the next preceding rib and will itself deepen such channel and thus carry on the work of the preceding rib; so that, although there are multiple ribs in each former, they form only a single helical channel or depression in the work. What is said above in regard to one former is true of the other former also; but as the second former operates on the opposite side of the work, the formers are rotated in opposite directions, so that, when the formers are properly indexed relative to each other, the ribs of one former will register with and deepen the channel impressed in the work by the ribs of the opposite former. If preferred, the helical ribs may turn or twist in the reverse direction to the ribs of the first mentioned former, that is, the ribs of one set may be right-handed and the ribs of the other set left-handed and the two formers rotated in the same direction. Otherwise expressed, the several ribs of each former work simultaneously on different portions of the same helical channel, and the ribs of the second former simultaneously operate on the intervening sections of said channel. It is noted that on account of the multiplicity of places where the work is being operated on simultaneously to produce a single channel (or thread), comparatively little displacement of the metal is effected at any one place at any one time, so that the metal has ample time to accommodate itself by plastic flow to the new position required of it. It is also noted that the metal between successive turns of the helical channel in the work constitutes the thread of the worm, and this thread is supported on opposite sides throughout the operation by successive ribs, which shape the sides of the thread, while the circumference or periphery of the thread is shaped by the body of the former between ribs, which portion bears radially against the displaced or flowed metal that constitutes the thread of the worm. It is also noted that the formers tend to displace the work in opposite directions at a plurality of points and thus counteract each other, if the formers are of the design shown in the drawings. This advantage is lost if the formers are made right and left-handed respectively and rotated in the same direction.

The above described process produces worms that are accurately formed and that have teeth with smooth surfaces. The process is simple and economical.

What I claim is:

1. The improvement in the process of making worms for worm gearing and the like, which consists in rotatably mounting cylindrical stock in chucks holding said stock against endwise movement and endwise flow of metal, operating on said stock at diametrically opposite points with counterpart rotatable formers having helical ribs adapted to shape the thread of the worm, maintaining said formers in parallel relation and feeding said formers gradually towards each other, whereby the metal of the stock is caused to fill up the spaces between the ribs of the formers.

2. The improvement in the process of making worms for worm gearing and the like, which consists in rotatably mounting cylindrical stock in chucks holding said stock against endwise movement and endwise flow of metal, operating on said stock at diametrically opposite points with counterpart rotatable formers having helical ribs adapted to shape the thread of the worm, maintaining said formers in parallel relation and disposing them so that one rib carries on the work of the next preceding rib, whereby a slight amount of work is done at a given time by a given rib, and feeding the formers gradually toward each other, whereby the metal of the stock is caused to fill up the spaces between the ribs of the formers.

3. The improvement in the process of making worms for worm gearing and the like, which consists in rotatably mounting cylindrical stock in chucks confining the stock against endwise movement and endwise flow of metal, operating on said stock simultaneously at diametrically opposite points with counterpart rotatable formers having helical ribs adapted to shape the thread of the worm, maintaining said formers in parallel relation and feeding the formers gradually toward each other, whereby the metal of the stock is caused to fill up the spaces between the ribs of the formers.

4. The improvement in the process of making worms for worm gearing and the like, which consists in rotatably mounting cylindrical stock in chucks confining the stock against endwise movement and endwise flow of metal, operating on said stock at separated points with counterpart rotatable formers having helical ribs adapted to shape the thread of the worm, maintaining said formers in parallel relation and feeding said formers gradually towards the axis of the work, whereby the metal of the stock is caused to fill up the spaces between the ribs of the formers.

5. The improvement in the process of making worms for worm gearing and the like, which consists in rotatably mounting cylindrical stock in chucks confining said stock against endwise movement and endwise flow of metal, operating on said stock at diametrically opposite points with counterpart rotatable formers having helical ribs adapted to shape the thread of the worm, maintaining said formers in parallel relation and feeding them gradually towards each other, whereby the metal of the stock is caused to fill up the spaces between the ribs of the formers.

6. The improvement in the process of making worms for worm gearing and the like, which consists in rotatably mounting cylindrical stock in chucks confining the stock against endwise movement and endwise flow of metal, operating on said stock at diametrically opposite points with counterpart rotatable formers having helical ribs adapted to shape the thread of the worm, maintaining said formers in parallel relation and feeding them gradually toward each other, whereby the metal of the stock is caused to fill up the spaces between the ribs of the formers.

7. The improvement in the process of making worms for worm gears and the like, which consists in rotatably mounting cylindrical stock confining the stock against endwise movement, and operating on said stock simultaneously above and below by means of rotatable formers having helical ribs adapted to shape the thread of the worm.

Signed at Winchester, N. H. this 16th day of Sept. 1922.

GOUVERNEUR G. BROWNE.